March 30, 1954 W. B. DEAN ET AL 2,673,353
MOVABLE BERTH INSTALLATION
Filed July 7, 1950 5 Sheets-Sheet 1

INVENTORS.
Walter B. Dean
Garrett D. Pagon
BY
Maurice A. Crews
ATTORNEY

March 30, 1954  W. B. DEAN ET AL  2,673,353
MOVABLE BERTH INSTALLATION
Filed July 7, 1950  5 Sheets-Sheet 2
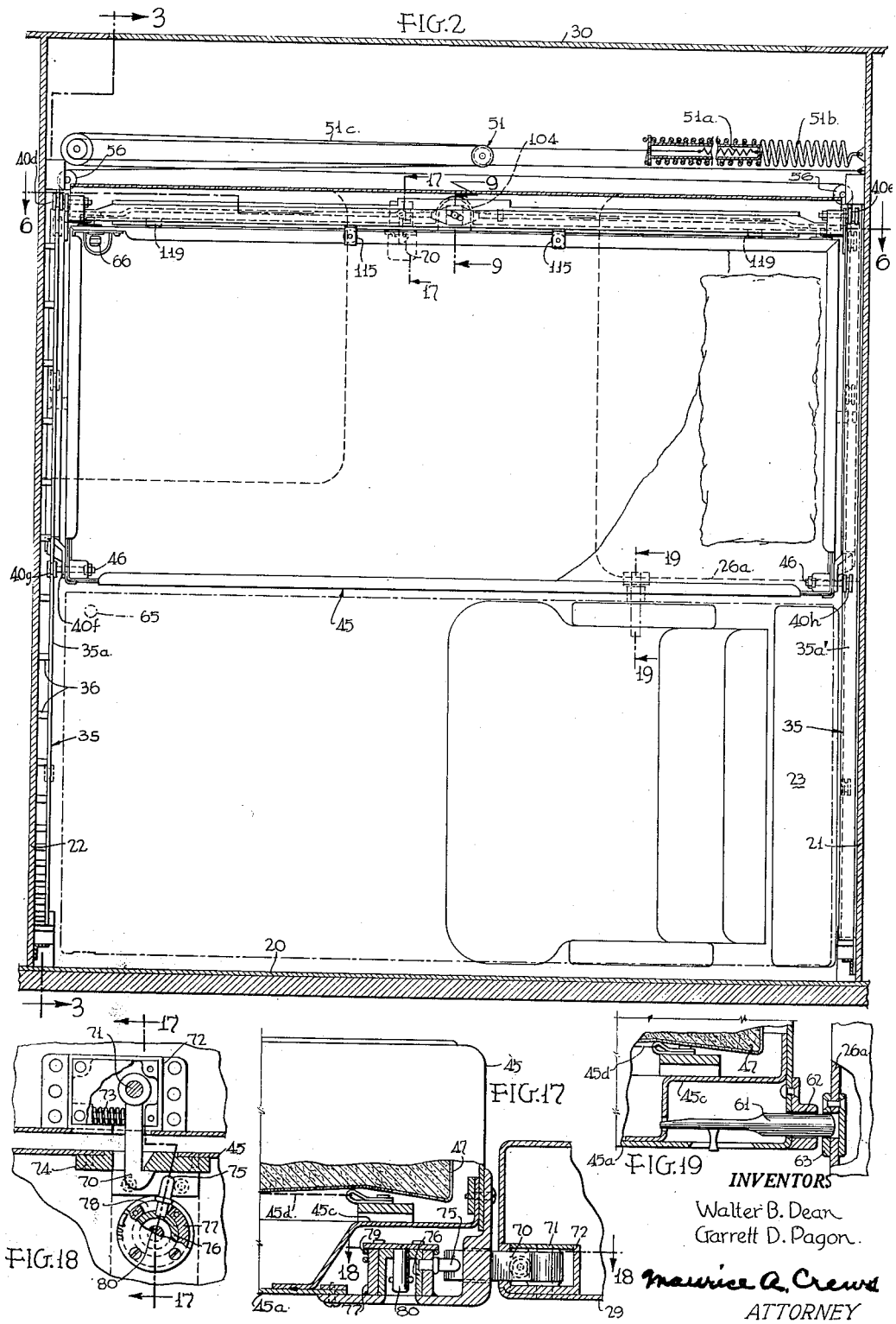
INVENTORS
Walter B. Dean
Garrett D. Pagon
Maurice A. Crews
ATTORNEY INVENTORS.
BY Walter B. Dean
Garrett D. Pagon
Maurice A. Crews
ATTORNEY March 30, 1954 W. B. DEAN ET AL 2,673,353
MOVABLE BERTH INSTALLATION
Filed July 7, 1950 5 Sheets-Sheet 4
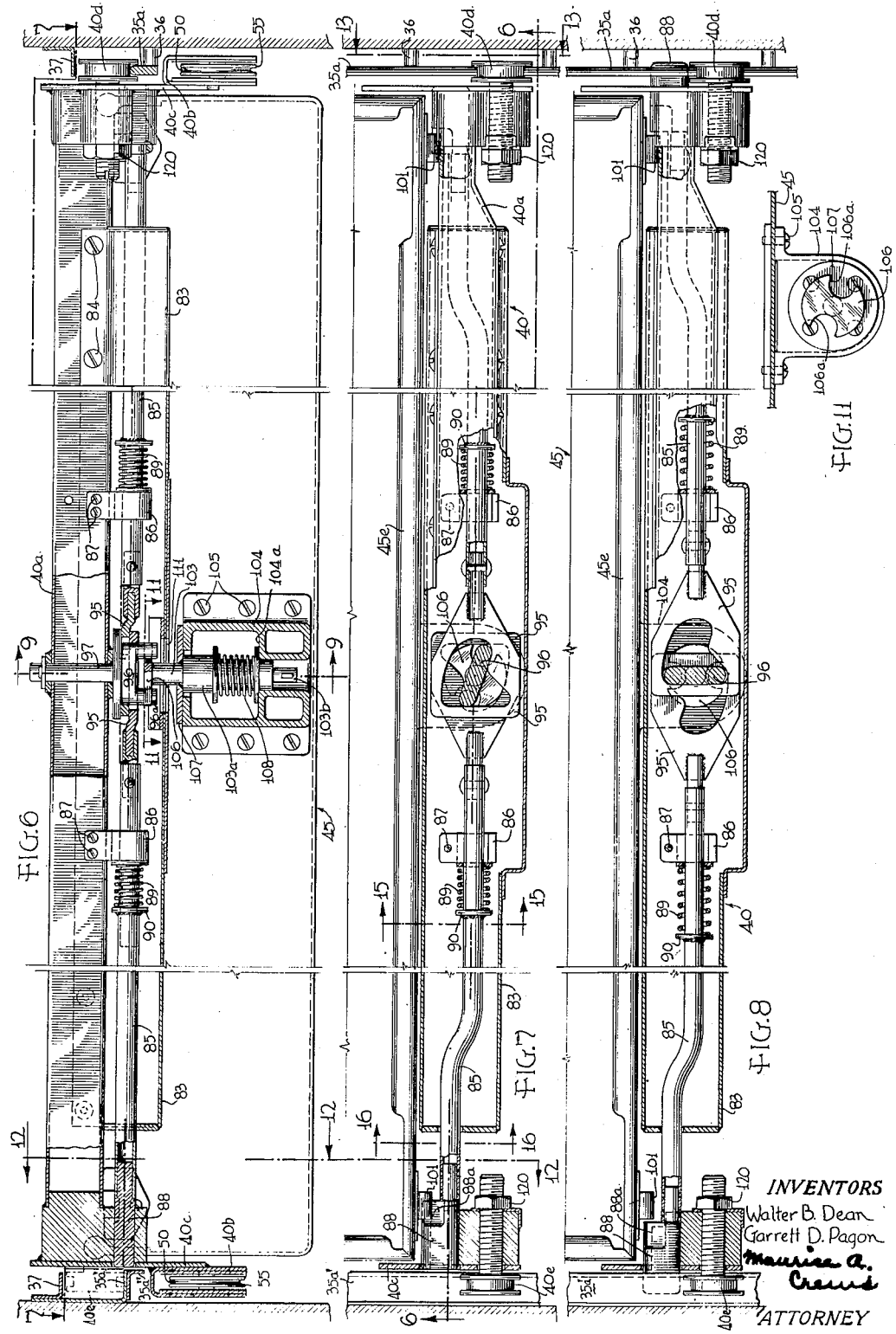
INVENTORS
Walter B. Dean
Garrett D. Pagon
Maurice A. Crews
ATTORNEY March 30, 1954  W. B. DEAN ET AL  2,673,353
MOVABLE BERTH INSTALLATION
Filed July 7, 1950  5 Sheets-Sheet 5
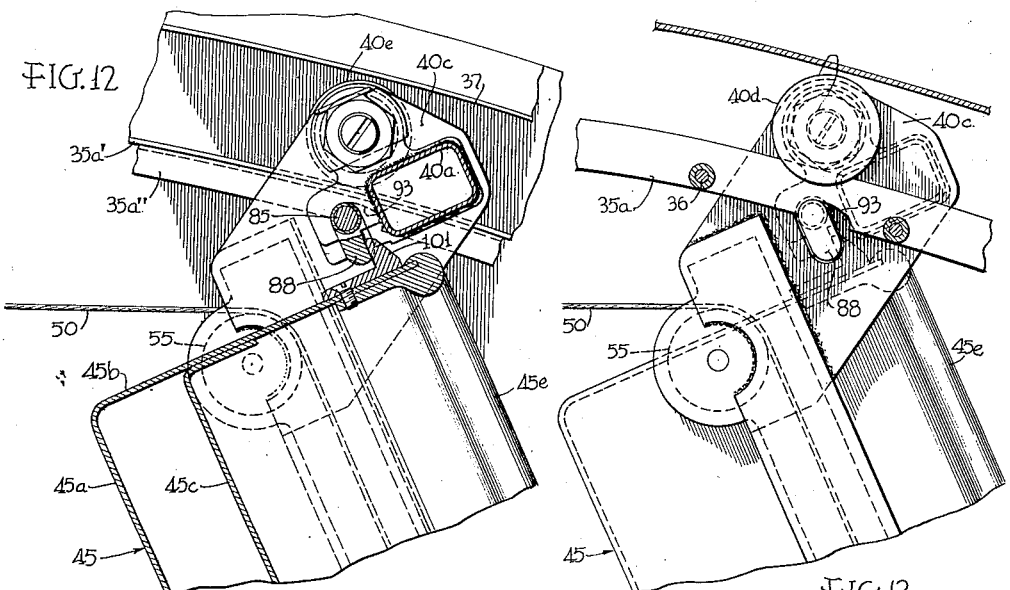
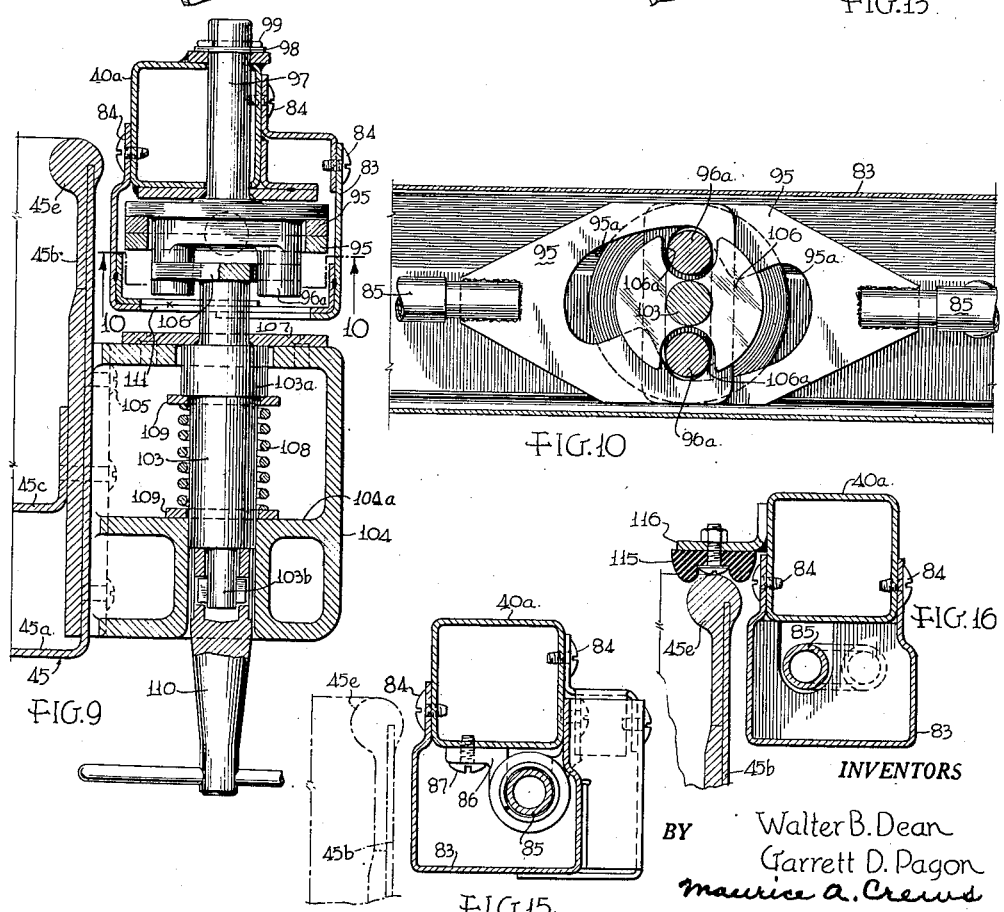
INVENTORS
Walter B. Dean
Garrett D. Pagon
BY Maurice A. Crews
ATTORNEY Patented Mar. 30, 1954

2,673,353

UNITED STATES PATENT OFFICE 2,673,353

MOVABLE BERTH INSTALLATION

Walter B. Dean, Paris, France, and Garrett D. Pagon, Ambler, Pa., assignors to The Budd Company, Philadelphia, Pa., a corporation of Pennsylvania Application July 7, 1950, Serial No. 172,494

14 Claims. (Cl. 5—9)

This invention relates to a movable berth installation, especially adapted for use on vehicles, and has for an object the provision of improvements in this art.

The berth has been developed for and used on railway sleeping cars and will be illustrated and described in this environment though without intention of imposing any limitations thereby. It is related to and constitutes an improvement upon the invention of John C. Lyon, Serial No. 762,920, filed July 23, 1947, now Patent No. 2,592,924, issued April 15, 1952, both the present and that invention belonging to a common assignee. The Lyon application is itself an improvement upon the invention of Goodrich K. Murphy, Patent Number 2,462,027, February 15, 1949.

One of the particular objects of the present invention is to provide a berth which is mounted on a carriage which is movable on tracks and which includes an improved mounting arrangement on the carriage.

Another object is to provide a carriage-and-track mounted berth having improved means for locking the berth to the carriage for movement therewith and for unlocking the berth from the carriage and locking the carriage in fixed position for occupancy use of the berth.

Another object is to provide improved means for locking the carriage in stowed position and for insuring that the berth-releasing latch cannot be actuated in the stowed position or any position except that at which the berth will be used.

Another object is to provide improved berth latching means which minimizes injury to its parts when the berth is folded upon the carriage in an irregular manner.

The above and other objects and advantages of the invention will be apparent from the following description of an exemplary embodiment thereof, reference being made to the accompanying drawings, wherein:

Fig. 2 is a top plan view showing in full lines the berth in the stowed position and in broken lines the berth in the use position, the surface of the view being indicated by line 2—2 in Fig. 3;

Fig. 6 is an enlarged vertical longitudinal section and elevation taken on the line 6—6 of Figs. 2 and 7;

Fig. 7 is a horizontal longitudinal section taken on the line 7—7 of Fig. 6;

Fig. 8 is a view like Fig. 7 but showing the parts in position to lock the carriage and release the berth from it;

Fig. 9 is an enlarged section taken on the line 9—9 of Fig. 6, the section also being indicated on Fig. 2;

Fig. 10 is an enlarged section taken on the line 10—10 of Fig. 9;

Fig. 11 is a section and elevation taken on the line 11—11 of Fig. 6 but showing the parts on the berth separated from the parts on the carriage;

Fig. 12 is a partial enlarged section and elevation showing parts in the zone 12—13 of Fig. 4, the section being taken on the line 12—12 of Fig. 7;

Fig. 13 is a similar view in the same zone, the view being taken on the line 13—13 of Fig. 7;

Fig. 15 is an enlarged section of a detail, the view being taken on the line 15—15 of Fig. 7;

Fig. 16 is an enlarged section of a detail, the view being taken on the line 16—16 of Fig. 7;

Fig. 17 is an enlarged vertical section of a latch for holding the berth-carriage assembly in stowed position, the view being taken on the line 17—17 of Fig. 2 and also being shown on Fig. 18;

Fig. 18 is a section taken on the line 18—18 of Fig. 17; and

Fig. 19 is an enlarged section through a hold-down latch for the berth, the view being taken on the line 19—19 of Fig. 2.

Figure 1:
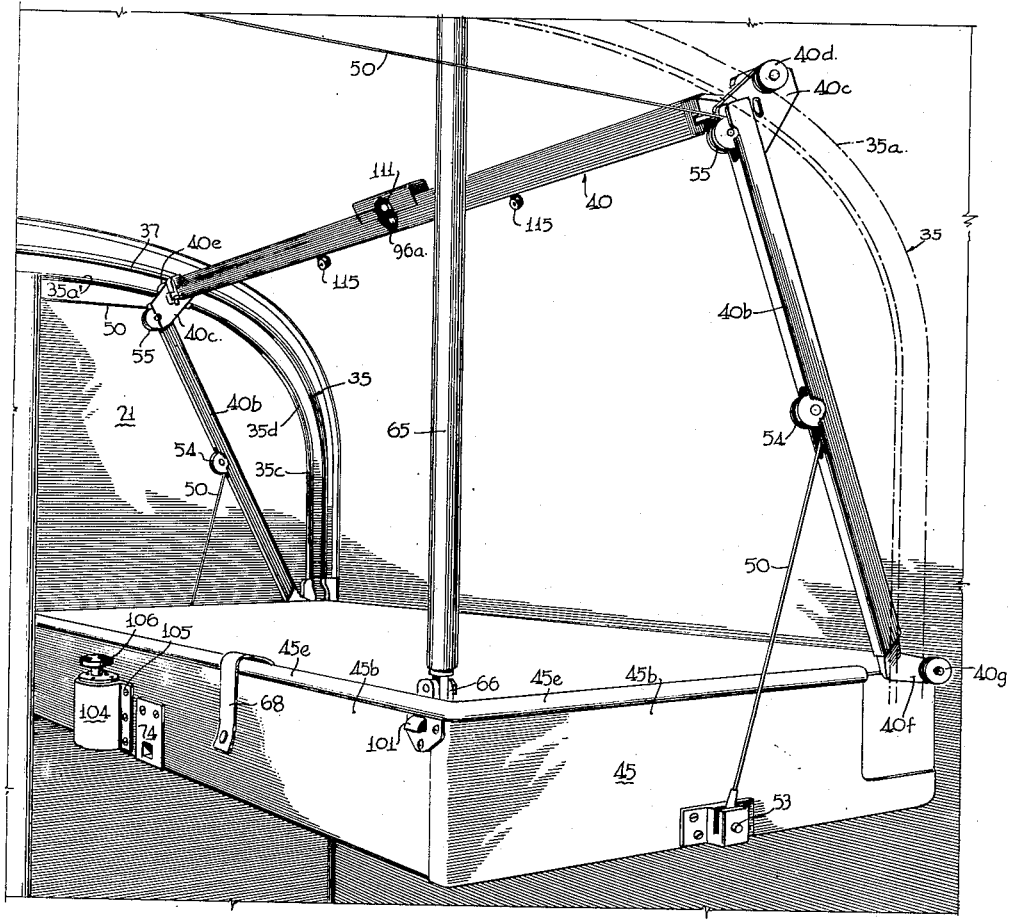
Fig. 1 is an end perspective view of the berth in the lowered or use position with the carriage locked in position.

In the Murphy Patent No. 2,462,027 the general environment of the invention is illustrated. In the installation shown in that patent a sliding berth moves on double trackways from an overhead stowed position to a lowered position where the lower edge of the berth stops on pivot means in one trackway and the upper edge of the berth leaves the other trackway to swing down into use position. The lower berth is swung down from an end wall before the upper berth is pulled down, the upper berth in its stowed position being laterally clear of the lower berth to permit it to be swung down.

In the Lyon application, now patent, referred to above, the berth assembly is mounted in a single trackway and a carriage is added to the berth assembly so that the supporting rollers do not have to leave the trackway; instead, in the lowered position, the berth swings down relative to the carriage, which itself is latched against reverse movement. In addition, a rigid push-pull strut is provided for holding the free edge of the berth. This strut is disclosed in another application of John C. Lyon, S. N. 689,915, filed August 12, 1946, now Patent No. 2,560,513, issued July 10, 1951, assigned to a common assignee.

Inasmuch as the general environment and use of the berth have become well-known, both from the Murphy patent and from commercial operations, it is thought to be unnecessary here to enlarge upon the illustration of the environment, enough, however, being shown to indicate the setting of the invention.

In Fig. 2 the outside wall 20 of the car is shown, as are the compartment end wells 21 and 22. The wall 21 will be assumed to be a full permanent wall and the lower berth 23 is shown to be mounted against or upon it; the wall 22 may be only the permanent top portion of a dividing wall whose lower portion folds up as a door, all as described in the Murphy patent.

Figure 3:
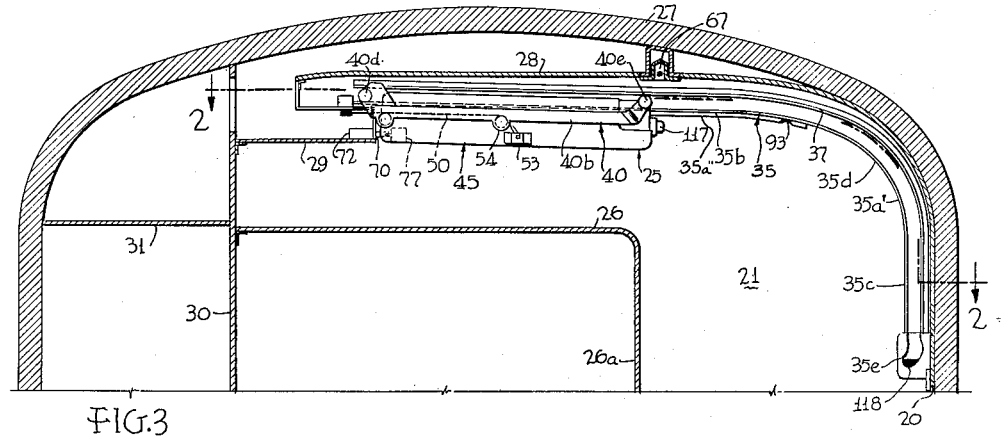
Fig. 3 is a vertical transverse section and elevation taken on the line 3—3 of Fig. 2, showing the berth in stowed position.
Figure 4:
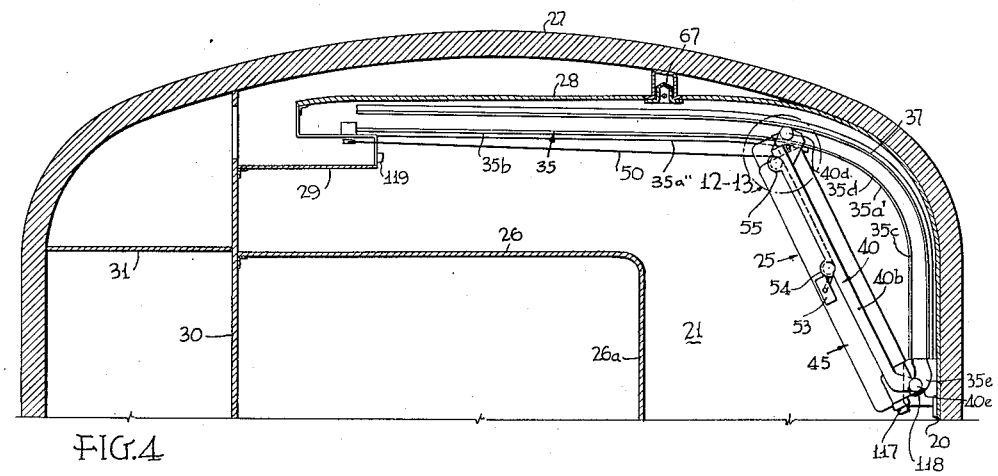
Fig. 4 is a similar view showing the berth-carriage assembly in lowered position.
Figure 5:
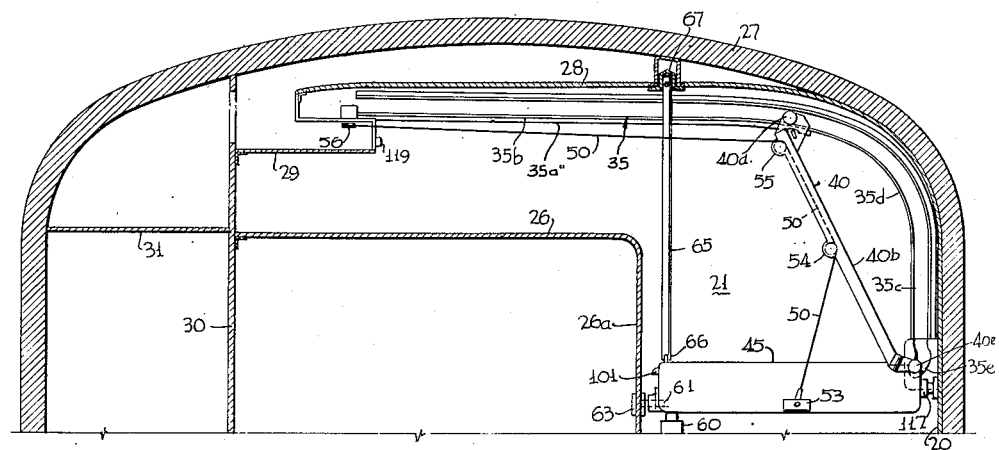
Fig. 5 is a similar view showing the berth in the lowered or use position.

As shown in Figs. 3, 4 and 5, the upper berth assembly 25 is required to move out over an interior compartment, such as a closet or toilet 26, and to swing down until its free inner edge is positioned closely adjacent the outer wall 26a of this interior compartment. The car roof is designated as 27, the interior ceiling as 28, and a dropped ceiling as 29. In stowed position the bottom of the berth assembly forms in effect a continuation of the dropped ceiling 29, as best shown in Fig. 3. An aisle wall is designated as 30 and the aisle ceiling as 31.

Figure 14:
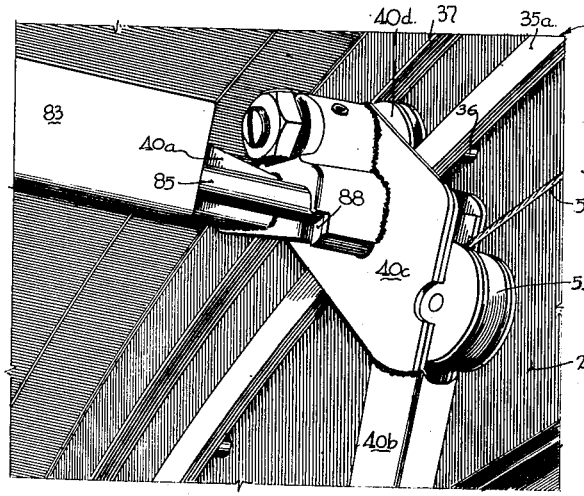
Fig. 14 is a perspective view of a carriage support detail.

A trackway 35 is provided for the berth-carriage assembly. It comprises a track rail 35a at one end supported from the superstructure in any convenient manner. In the illustrated embodiment, as shown in Figs. 2, 6 and 14, the track rail 35a is carried on supporting and spacing elements 36 attached to the upper portion of the wall 21. The other rail 35a' is wide and plain and comprises part of an angle-section piece secured to the side wall 22. It is reinforced at the top (Figs. 3 to 6 and 12) by a lower angle section piece 35a". An angle-section wheel retaining track guard 37 is secured in position immediately above and spaced from each rail 35a, 35a'.

As best shown in Figs. 3, 4 and 5, the trackway 35 comprises an upper generally horizontal portion 35b, a lower generally vertical portion 35c, and a connecting portion 35d. The upper and lower portions are generally rectilinear and the connecting portion is curved, the entire trackway conforming fairly closely to the surface of the compartment.

The berth-carriage assembly 25 comprises a carriage 40 and a berth proper 45. The carriage includes a longitudinal bar 40a, end bars 40b, upper-inner wheel brackets 40c carrying wheels 40d, 40e, and lower-outer wheel brackets 40f carrying wheels 40g and 40h. All of the wheels 40d, 40e, 40g, and 40h are shown as grooved double-flanged wheels adapted to ride on the ribbed rail 35 but the wheels 40e and 40h which ride on the plain smooth rail 35a' are not constrained laterally and thus provide end play to avoid binding on the trackway if irregular in width. Alternatively to provide a plain rail, the wheel shafts or one of each pair may be provided with axial movement to take care of end play, all wheels in this case fitting on a ribbed track.

The berth 45 is hinged to the carriage 40 at its lower-outer edge on the same axis as that of the lower wheels 40g, 40h, as best shown in Fig. 2, the wheel shafts 46 there being shown to form the hinge pins of the berth.

The berth 45 is formed as a rectangular pan with a bottom wall 45a and side walls 45b, with interior supporting ledges 45c for mattress springs 45d. The springs are shown in Figs. 17 and 19. The berth is formed with a bulbous upper edge 45e to avoid injury to personnel and to rigidify the box-like berth frame. A mattress 47 is shown in the berth in Figs. 17 and 19.

The berth 45 and frame 40, that is the assembly unit 25, are supported and urged upward by cables 50, one at each end, and weight balancing means 51, indicated in Fig. 2 as a system of sheaves with springs, weights, or the like connected to them. The spring means may be the same as that shown in S. N. 762,920, Patent No. 2,592,924, that is with the action of a light spring 51a preceding that of a heavier spring 51b as the assembly moves away from stowed position. But instead of using the differential sheaves shown in the prior application, the present apparatus uses a sheave and cable system 51c. At their lower ends the cables are attached to fittings or anchorages 53 secured to the ends of the berth 45, the cables passing upward over sheaves 54 mounted on the carriage end bars 40b, sheaves 55 on the upper-inner edge of the carriage, and then over sheaves 56 at the upper-inner ends of the trackway to the cable connections overhead. By this arrangement the cable take-up mechanism first raises the free edge of the berth against the carriage and thereafter raises the entire berth-carriage into stowed position. It is disclosed in the prior application referred to that the cable take-up power system is designed to approximately equal the lifting requirements at all stages of movement, that is, with the light spring 51a acting while the carriage is moving along the horizontal portion of the track and the heavier spring 51b acting while the carriage is moving along the vertical portion of the track where gravity has greater effect and the same principle is used herein, as described above.

In its lower use position the inner bottom edge of the berth in the corner adjacent the toilet wall 26a rests on a resilient bumper carried by a wall bracket 60 (Fig. 5) and is held down at this corner (Fig. 19) by a sliding bolt latch 61 which operates in guides 62 on the berth and enters the hole of a keeper fitting 63 secured to the wall 26a.

At the other inner corner the berth is supported by a push-pull strut rod 65 which is pivotally carried by a corner of the berth at a fitting 66 and is releasably connected to the ceiling at a socket fitting 67. This strut and its use are fully disclosed in the application referred to so need not be disclosed further herein. When the strut is disconnected it is folded against the inner top rail of the berth and is held in place by a strap 68 which is passed over the strut and is held down, as by a snap fastening, at its free end.

In its upper stowed position the berth is held by a swinging hook latch 70 which is pivoted at 71 on a fitting 72 secured in fixed position to the dropped ceiling 29. The position is indicated in Figs. 2 and 3 and the latch mechanism is shown in detail in Figs. 17 and 18. The latch is urged by a spring 73 into engaging position with a keeper 74 carried on the berth. The latch is disengaged, when desired, by a turnable pin or finger 75 carried by a hollow journal or cylinder 76 carried in a bearing cylinder 77, the pin having arcuate movement in a slot 78 formed in the cylinder 77. The pin 75 is urged to an inactive position by a spring 79 and its journal is provided with an operating pin or element 80 adapted to take a turn key to move the finger in the other direction to disengage the latch from the keeper when desired. The key may be the same as that commonly used by porters for operating berth latch mechanisms in sleeping cars.

The interrelated latch mechanism for locking the berth to the carriage and for locking the carriage in lower position will now be described. In Figs. 6 and 9 particularly, it may be seen that the longitudinal bar or rail 40a of the carriage frame is provided with a detachable housing or casing 83 secured at its edges to the bar by screws 84. This casing encloses carriage latching mechanism which includes latch bolt rods 85 slidably mounted in guide brackets 86 intermediate their ends, the brackets 86 being secured to the bar 40a, as by screws 87, two being shown in one angular attaching wing and one in the other. The rods at their outer ends carry latch bolts or plungers 88 which are slidable within guide openings in the upper end brackets 40c carrying the carriage wheels. The rods 85 are urged outward by compression springs 89 which engage the brackets 86 at one end and collars 90 fastened on the rods at their outer ends.

As best shown in Figs. 12 and 13, the latch bolts or plungers 88 are adapted to enter notches or holes 93 formed in the track rails 35a, 35a' these holes being located in the position where the carriage is in its lowermost position. The notch for rail 35a' is in the vertical flange of the reinforcing angle piece 35a''. There are no holes along the length of the tracks in that part along which the bolt of the carriage is movable, consequently the latch bolts cannot be caught, even if pushed outward by the springs, but will only slide along the tracks, at all other positions of the carriage except that at the holes 93.

On their inner ends the rods 85 carry cam plates 95 and within the cam-shaped openings in these plates there is mounted an oblong cam 96 carried by a shaft 97 turnably supported in bearings in the carriage bar 40a. The shaft is retained in place, as by a washer 98 and a cotter pin 99.

The cam-shaped surfaces 95a of the plates 95 are so configured and arranged that the cam 96 in one extreme position, as shown in Fig. 7, locks the rods 85 in their inward position; and in the other extreme position, as shown in Fig. 8, holds the rods in the outward position against further outward movement by the springs 89.

The latch bolts 88 have a dual but alternative latching action. In their extended position, as already noted, they engage holes in some fixed part, here the track rails, and hold the carriage in its lowermost position; and in their retracted position they have portions 88a which are adapted to move behind keeper lugs 101 carried by the berth to hold the berth securely in folded position on the carriage. There is some overlap in the alternative latching actions, but it can be seen that the berth cannot be disconnected from the carriage until the carriage is locked in its lowermost position, and that the carriage cannot be moved until the latch bolts are in berth-engaging position.

This gives positive assurance that the berth cannot drop down from an overhead position to cause injury or get jammed in an improper position. It would also be difficult without a special tool to unlatch the berth from the carriage in any position. The invention provides such a special tool in the form of an operator carried by the berth. There are several safety factors involved in the locational arrangement of the operating device on the berth. For one thing, it requires the operator to have manual control over the movement of the berth so it will not drop down too fast in case it should be overweighted or in case the cable counterweights should fail or be inadequate; also so it will not fly up too rapidly if underweighted. For another thing, there is easier access to a part carried on the berth than to a part which would be hidden above its upper edge.

In furtherance of the above advantages, a turning device or shaft element 103 is mounted in a casing or frame 104 secured to the upper-inner edge of the berth, as by screws 105. On its end toward the carriage the device 103 is provided with an engaging element 106, this element here taking the form of a plate having a plurality of notches 106a adapted to engage spaced pins 96a provided on the outer surface of the cam 96 carried by the shaft element 97 on the carriage. The shaft elements 97 and 103 are, therefore, equivalent to a single shaft when coupled together but are separable by axial movement when the berth separates from the carriage, this separation being permitted only when the carriage is latched in a fixed position along the trackway at the use position of the berth.

An enlarged portion 103a on the turning device 103 provides one shoulder for engaging a plate 107 which retains it in the assembly, and another shoulder for the engagement of a spring 108 which by reaction against a surface 104a of the casing urges the device 103 toward the cam. Washers 109 are placed between the ends of the springs and adjacent surfaces.

The outer end or stem 103b of the device 103 is provided with interengaging means for a key 110 such as is commonly used by a sleeping car porter, the stem being recessed into the hole in the casing to prevent easy access of any but the proper key. The key, in known manner, engages in bayonet-joint fashion to provide turning movement in either direction and also to provide a push-pull action without releasing the stem. The berth may thus be pushed up or pulled down and the key turned in a positive manner, all by the use of one hand on the key.

The casing 83 on the carriage bar 40a is provided with an opening 111 to admit the operating plate 106 to the pins 96a on the cam. If the plate 106 should not be turned to the correct position for the notches 106a to engage the pins 96a when the berth is pushed up, the flat end surfaces of the plate 106 will hit the ends of the pins and the entire operating device 103 will move back against the spring 108 until the correct engaging position is reached by turning the key 110.

Resilient bumpers 115 are carried by brackets 116 on the carriage bar 40a to absorb the shock if the berth is swung up rapidly against the carriage. When the berth is lowered into the use position, as shown in Fig. 5, bumpers 117 carried by brackets secured to the lower outer edge of the berth engage scuff plates carried on the side wall of the car to absorb the falling shock of the berth and also to push the wheels out into return notches 35e of the track rails whereby to retain the carriage in lowermost position as long as the berth is lowered relative to the carriage, even if the latch bolts 88 should in some unauthorized manner be withdrawn from carriage-locking position.

It may be noted from Figs. 2 and 3 that when the berth-carriage assembly is in stowed position the casing 104 for the latch operating device 103 is enclosed by the fixed walls of the car so that it is impossible to insert the key 110 in the hole to engage the stem 103b of the latch operating device. However, the key hole for the releasing stem or pin 80 is accessible for insertion of the key. By this arrangement there is never any confusion as to which latching device one should attempt to operate when the berth-carriage assembly is in stowed position. It is true that the carriage latching bolts 88 could not be operated in this position, but something might be broken in the attempt.

Resilient bumpers 118 are secured in the lower end of the rails 35 to absorb the shock if the carriage is dropped too rapidly. Resilient stop means or bumpers 119 are provided to limit the movement of the berth-carriage assembly into stowed position without undue shock.

The track wheel shafts are preferably made adjustable to accommodate track width variations due to non-uniform spacing of partition wall installations. As illustrated, the shafts are threaded in their supports and are locked in adjusted position, as by lock nuts 120.

In operation, starting with the berth assembly in stowed position, the key 110 is inserted in the socket to engage the stem 80 and is turned and simultaneously pulled sidewise away from the wall to cause the finger 75 to release the latch 70 from the keeper 74 and then to pull the berth assembly away from the latch. The key cannot be inserted in the socket for the stem 103b of the berth-to-carriage latch operator 103 because that socket is covered by the outer edge of the dropped ceiling panel 29. The latch operator casing 104 projects from the edge of the berth and enters a walled recess in the vertical sheet extending between the dropped ceiling 29 and the main cealing 28.

The berth assembly may now be pulled fully outward until the carriage is in its lowermost position. The key may during this movement be kept in the socket of the stem 80 where it was placed to release the assembly or it may be transferred to the other latch operator. In either position it can be used as a hand grip to pull the parts down. If not kept in either socket during this travel, it will be inserted in the hold-down latch socket after the carriage has been moved to lowermost position.

By the key the shaft 103 is turned and this, through notched plate 106 and pins 96a of shaft 97, turns the shaft and the cam 96 on it to release the latch rods 85 which then move out into latching position by action of the springs 89. The latch bolts 88 engage the recess 93 in the tracks and hold the carriage in its lowermost position. The latch rods are positively moved out by the cam 96 if the springs should not prove adequate for the purpose.

In the final phase of the carriage latching action the berth is unlatched from the carriage by the outward travel of the latch bolts 88 to clear the berth lugs 101 as they enter the recesses or sockets in the track. The berth may be pulled down on its hinges on the carriage by pulling on the key.

As the berth nears its lowermost or use position the bumpers 117 on the lower-outer edge come against their scuff plates on the side wall and push the lower edge of the carriage and the berth inward away from the outer car wall, the wheels 40g, 40h entering the notches 35e of the track to lock this lower edge against upward movement as long as the berth is lowered.

The free edge of the berth at the bottom rests upon the bumper 60 and while the berth is still being held down it is locked down by the sliding latch 61. Then the strut 65 is released from the holding strap 68, raised vertically into the socket of the ceiling fitting 67 and manipulated until it is securely anchored in place. Thereafter the protecting web guards, not shown, are put up in known manner.

From the above description of the lowering operations, it will be obvious how the reverse operations are performed to fold the berth on the carriage and carry the assembly to stowed position where it is automatically caught and held by the latch 70.

It is to be noted that once the upper edge of the carriage is locked in lowermost position it is securely held in this position, and although the final movement of the lower edge of the carriage may cause the upper edge to move back slightly (the sockets for latch bolts 88 being long enough for this slight movement) the latch bolts 88 do not move out of their sockets.

It is thus seen that the invention provides an improved sliding berth installation, which is simple to build and install, easy to operate, and very dependable in service.

While one embodiment has been described and illustrated by way of example, it is to be understood that there may be various embodiments within the general concept of the invention.

What is claimed is:

1. A movable berth installation comprising in combination, spaced overhead track rails, each including a generally horizontal upper portion, a generally vertical lower portion, and a curved connecting portion joining the horizontal and vertical portions, a carriage-berth assembly riding on said rails to move from an overhead position to a lowered position, the berth having hinging movement about one side relative to said carriage, latch means carried by said carriage-berth assembly and cooperating with mating fixed means alongside said assembly for latching the assembly in lowered position, means extending along the path of movement of the latching element of the assembly latching means for preventing operation of said assembly latching means in all other than lowered position, and latching means between said berth and carriage which is operable for permitting movement of the berth from and into latching connection with the carriage when and only when the assembly is latched in lowered position.

2. A movable berth installation comprising in combination, a trackway supporting means, a trackway carried on said supporting means, said trackway including an upper lateral portion, a lower vertical portion and a curved portion connecting said upper lateral portion and said lower vertical portion, a berth-carriage assembly mounted for movement along said trackway, latch means between the assembly and trackway for latching the assembly in a fixed position relative to said trackway in the lowered position of the carriage at the bottom of the vertical portion of the trackway, means located along and comprising part of the trackway for positively holding said latch means against operation except when the assembly is in the lowered position, said latch means also including parts which hold said berth and carriage together when the assembly is moving along the trackway and which are releasable by the operation of the latch means to secure the assembly in latched position at the lowered position of the assembly to permit the berth to be separated from the carriage, said latch means holding the carriage in the same fixed position both when the berth is latched to the carriage and when it is lowered to the use position.

3. A movable berth installation comprising in combination, a trackway supporting means, a trackway carried on said supporting means, said trackway including an upper lateral portion, a lower vertical portion and a curved portion connecting said upper lateral portion and said lower vertical portion, a berth-carriage assembly mounted for movement along said trackway, latch means between the assembly and trackway for latching the assembly relative to said trackway in the lowered position of the carriage at the bottom of the vertical portion of the trackway, means along the trackway holding said latch means against operation except when the assembly is in the lowered position, said latch means also including parts which hold said berth and carriage together when the assembly is moving along the trackway and which are releasable by the operation of the latch means to secure the assembly in latched position at the lowered position of the assembly to permit the berth to be separated from the carriage, said latch means including separable operating shaft elements mounted, respectively, on the berth and on the carriage, the assembly latching means being carried on the carriage and being operated by that shaft element which is mounted on the carriage, and the shaft element which is mounted on the berth being provided with means for operating it by hand.

4. A movable berth installation comprising in combination, a carriage-berth assembly including means connecting the berth to the carriage so the berth and carriage move as a unit at times and the berth can be separated from the carriage at times, supporting and guiding means for the assembly providing controlled movement between a stowed position and a second position, a first latch means operable when the assembly is in the second position for holding the assembly in a fixed position, a second latch means between said berth and carriage which holds them locked together except in the second position and which is operable in the second position for releasing the berth from the carriage in response to the actuation of the first latching means for latching the assembly in fixed position, and operating means for both said first and said second latch means, said latch operating means including axially separable shaft elements mounted, respectively, on the carriage and on the berth so as to operate as a unit when the berth and carriage are positioned together and to be separated when the carriage is latched in fixed position and the berth is separated from the carriage.

5. A movable berth installation comprising in combination, a carriage-berth assembly, a trackway for said assembly providing movement from a stowed position to a use position, the assembly including mounting means for the berth on the carriage which provides movement of the berth away from and toward the carriage at the use position, means for latching the berth to the carriage when the berth is moved into assembly with the carriage, latch means carried by the carriage for latching and holding it in a single fixed position along the trackway in the use position, the berth latching means and the carriage latching means being interrelated to cause the berth to be unlatched from the carriage when the carriage is latched in fixed position, and latch operating means including separable shaft elements mounted, respectively, on the carriage and berth and which are connected when the berth is brought into assembly with the carriage for operating both of said latch means by the shaft element on the berth when the berth and carriage are brought together.

6. A movable berth installation comprising in combination, a carriage-berth assembly, a trackway for said assembly providing movement from a stowed position to a use position, the assembly including mounting means for the berth on the carriage which provides movement of the berth away from and toward the carriage at the use position, means for latching the berth to the carriage when moved into assembly with the carriage, latch means carried by the carriage for latching it in fixed position along the trackway in the use position, the berth latching means and the carriage latching means being interrelated to cause the berth to be unlatched from the carriage when the carriage is latched in fixed position, and latch operating means including separable shaft elements mounted, respectively, on the carriage and berth for operating both of said latch means by the shaft element on the berth when the berth and carriage are brought together, said carriage latching means including a plunger carried by the carriage which is engageable with a fixed element along its path of movement along the trackway, and the shaft element on the carriage producing projected and retracted movements of the plunger and holding the plunger against movement out of these positions after operation of the shaft element, and the shaft element on the berth including parts which are axially separable and re-engageable with the shaft element on the carriage to permit the latch means on the carriage to be operated when the berth and carriage are brought together and to leave the latched mechanism in a fixed stable position when the berth is separated from the carriage.

7. A movable berth installation comprising in combination, a carriage-berth assembly, a trackway for said assembly providing movement from a stowed position to a use position, the assembly including mounting means for the berth on the carriage which provides movement of the berth away from and toward the carriage at the use position, means for latching the berth to the carriage when moved into assembly with the carriage, latch means carried by the carriage for latching it in fixed position along the trackway in the use position, the berth latching means and the carriage latching means being interrelated to cause the berth to be unlatched from the carriage when the carriage is latched in fixed position, and latch operating means including separable shaft elements mounted, respectively, on the carriage and berth for operating both of said latch means by the shaft element on the berth when the berth and carriage are brought together, said carriage latching means including plungers carried at the ends of the carriage which are engageable with recesses along the path of movement of the carriage on the trackway at the use position, there being no available recesses at other positions along the trackway, whereby the plungers can be projected only in the use position of the carriage, resilient means urging said plungers into projected carriage latching position, said plungers carrying latching elements which latch the berth to the carriage when the plungers are retracted and which release the berth from the carriage when the plungers are projected outward and after they have locked the carriage in position, the latch operating means on the carriage including elements which hold the plungers fixedly in either projected or retracted position after operation, thus insuring that the latching means will not be operated except when the berth is brought into assembly with the carriage and the opearting means on the berth is coupled with the operating means on the carriage and intentionally operated from parts mounted on the berth.

8. A movable berth installation comprising in combination, a berth-carriage assembly, a trackway including a track at each end of the assembly providing movement of the assembly from a stowed position to a second position of use, the berth being mounted for movement with and relative to the carriage so as to be moved in the use position of the carriage from a closed position of the berth relative to the carriage to an open or use position of the berth, said carriage including end bars having track-riding elements such as wheels and a transverse bar connecting the end bars, latch means carried by said transverse bar for latching the carriage in fixed position at the second or use position along the trackway, latch means for holding the berth in assembly with the carriage and for releasing it for movement away from the carriage, means coordinating said berth latching means and said carriage latching means to cause the berth to be released from the carriage after the carriage has been latched in fixed position and the reverse, and means along said trackway for holding the carriage latching means against operation to the extent to cause release of the berth from the carriage at all positions except the use position of the berth along the trackway, and separable means which are connected when the berth is brought into assembly with the carriage for operating the latch means from parts carried on the berth.

9. A movable berth installation comprising in combination, a berth-carriage assembly, a trackway including a track at each end of the assembly providing movement of the assembly from a stowed position to a second position of use, the berth being mounted for movement with and relative to the carriage so as to be moved in the use position of the carriage from a closed position of the berth relative to the carriage to an open or use position of the berth, said carriage including end bars having track-riding elements such as wheels and a transverse bar connecting the end bars, latch means carried by said transverse bar for latching the carriage in fixed position at the second or use position along the trackway, latch means for holding the berth in assembly with the carriage and for releasing it for movement away from the carriage, means coordinating said berth latching means and said carriage latching means to cause the berth to be released from the carriage after the carriage has been latched in fixed position and the reverse, and means along said trackway for holding the carriage latching means against operation to the extent to cause release of the berth from the carriage at all positions except the use position of the berth along the trackway, and separable means which are connected when the berth is brought into assembly with the carriage for operating the latch means from parts carried on the berth, the separable latch operating means on the berth and carriage including separable shaft elements carried, respectively, on the carriage and berth, the separable portion of the shaft element on the carriage including spaced pins and the separable shaft element on the berth including an end plate having notches for engaging the pins on the carriage shaft element in a given position, the plate at other positions engaging the ends of the pins, and one of said shaft elements having resilient means whereby the shaft elements will move axially relative to each other except in the position for the notches of the disk to engage the pins.

10. A movable berth installation comprising in combination, a berth-carriage assembly, a trackway including a track at each end of the assembly providing movement of the assembly from a stowed position to a second position of use, the berth being mounted for movement with and relative to the carriage so as to be moved in the use position of the carriage from a closed position of the berth relative to the carriage to an open or use position of the berth, said carriage including end bars having track-riding elements such as wheels and a transverse bar connecting the end bars, latch means carried by said transverse bar for latching the carriage in fixed position at the second or use position along the trackway, latch means for holding the berth in assembly with the carriage and for releasing it for movement away from the carriage, means coordinating said berth latching means and said carriage latching means to cause the berth to be released from the carriage after the carriage has been latched in fixed position and the reverse, and means along said trackway for holding the carriage latching means against operation to the extent to cause release of the berth from the carriage at all positions except the use position of the berth along the trackway, and separable means which are connected when the berth is brought into assembly with the carriage for operating the latch means from parts carried on the berth, said latch means on the carriage including plungers which conjointly lock the carriage in position along the trackway and release the berth from the carriage, and cam operating means between said plungers and the shaft element on the carriage for operating the plungers and holding them fixedly in either projected or retracted position except by movement of said shaft element.

11. A movable berth installation comprising in combination, a berth-carriage assembly movable from a stowed position to a second or use position, first latch means carried on said assembly for locking it fixedly in the second position, said first latch means being associated with elements along the path of movement of the assembly between stowed and the second position which render said first latch means operable only in the second position of the assembly, second latch means for latching the carriage in stowed position, each of said latch means including a turnable element having its outer end disposed in a recess and provided with interengaging means to receive an operating element such as a berth latch key.

12. A movable berth installation comprising in combination, a berth-carriage assembly, a trackway along which said assembly moves from a stowed position to a second or use position, wheels on the upper and lower edges of the carriage mounted for movement along said trackway, the berth being hinged to the carriage to swing down for use in the second assembly position, a fixed lower wall portion relative to which the lower ends of the trackway are fixed, means carried by said berth for engaging said wall portion and exerting a force tending to move the berth-carriage hinge relative to said wall and trackway when the assembly is in the second position and the berth is swung down into its use position whereby a binding force between the lower carriage wheels and trackway is produced to hold the assembly in fixed position along the trackway, and other interengaging means between said carriage and trackway for holding the assembly in fixed position along the trackway in said second position both before and after the berth is swung down into its use position and during the time it is down.

13. A movable berth installation comprising in combination, a berth-carriage assembly, a trackway along which said assembly moves from a stowed position to a second or use position, the berth being hinged to the carriage to swing down for use in the second assembly position, a fixed lower wall portion relative to which the lower ends of the trackway are fixed, means carried by said berth for engaging said wall portion and exerting a force tending to move the berth-carriage hinge relative to said wall and trackway when the assembly is in the second position and the berth is swung down into its use position whereby a binding force between said assembly and trackway is produced to hold the assembly in fixed position along the trackway, and other interengaging means between said assembly and trackway for holding the assembly in fixed position along the trackway in said second position both before and after the berth is swung down into its use position, said wall engaging means on the berth including resilient buffer elements and said trackway having notches into which elements carried by the assembly are forced when the berth is swung down to lock the assembly in fixed position by the swinging action of the berth and the interaction of said buffer means with the wall portion.

14. A movable berth installation comprising in combination, with carriage-berth assembly, a trackway along which said assembly moves from an overhead stowed position to a second position where its lower edge is disposed adjacent said walls, guiding and retaining elements on the upper and lower edges of the carriage movable along said trackway, the berth being pivoted at its lower edge on the lower edge of the carriage, resilient buffer means between said assembly and a fixed part such as the trackway for easing the stop of the assembly in the second position, resilient buffer means between the berth and a fixed part such as the side wall near the pivot for easing the stop of the berth in its turning movement about its pivots, this turning action of the berth and the reaction against the wall causing the lower guide elements of the carriage to be wedged against the trackway, resilient buffer means between the berth and carriage for easing the stop of the berth when closed against the carriage, and resilient buffer means for easing the stop of the assembly in its stowed position.

WALTER B. DEAN.
GARRETT D. PAGON.

References Cited in the file of this patent

UNITED STATES PATENTS

| Number | Name | Date |
| --- | --- | --- |
| 1,417,719 | Covington | May 30, 1922 |
| 2,216,243 | Kreidler | Oct. 1, 1940 |
| 2,358,546 | Tully et al. | Sept. 19, 1944 |
| 2,462,027 | Murphy | Feb. 15, 1949 |
| 2,504,769 | Watter | Apr. 18, 1950 |
| 2,592,924 | Lyon | Apr. 15, 1952 |